(12) United States Patent
Obendiek

(10) Patent No.: US 6,764,127 B2
(45) Date of Patent: Jul. 20, 2004

(54) TOP FOR A CONVERTIBLE VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/391,082

(22) Filed: Mar. 17, 2003

(65) Prior Publication Data

US 2004/0108747 A1 Jun. 10, 2004

(30) Foreign Application Priority Data

| Mar. 18, 2002 | (DE) | ........................................ 102 11 986 |
| Apr. 24, 2002 | (DE) | ........................................ 102 18 263 |
| Apr. 25, 2002 | (DE) | ........................................ 102 18 463 |

(51) Int. Cl.⁷ ................................................ B60J 7/00
(52) U.S. Cl. .................. 296/107.09; 296/108; 296/122; 296/107.07
(58) Field of Search ........................... 296/107.09, 108, 296/223, 116, 121, 219, 122, 107.17, 107.16

(56) References Cited

U.S. PATENT DOCUMENTS

| 5,746,470 | A | * | 5/1998 | Seel et al. .................... 296/108 |
| 5,903,119 | A | * | 5/1999 | Laurain et al. ......... 296/107.09 |
| 5,971,470 | A | * | 10/1999 | May et al. ............. 296/107.09 |
| 5,998,948 | A | * | 12/1999 | Lange et al. ................. 296/122 |
| 6,010,178 | A | * | 1/2000 | Hahn et al. ............ 296/107.08 |
| 6,042,174 | A | * | 3/2000 | Durrani ....................... 296/122 |
| 6,053,560 | A | * | 4/2000 | Rothe .......................... 296/108 |
| 6,123,381 | A | * | 9/2000 | Schenk ................... 296/107.07 |
| 6,139,087 | A | * | 10/2000 | Wolfmaier et al. ......... 296/122 |
| 6,155,614 | A | * | 12/2000 | Lange ......................... 292/113 |
| 6,209,945 | B1 | * | 4/2001 | Aydt et al. ............. 296/107.15 |
| 6,270,143 | B1 | * | 8/2001 | Heselhaus et al. ..... 296/107.09 |
| 6,299,234 | B1 | * | 10/2001 | Seel et al. .................... 296/108 |
| 6,305,734 | B1 |   | 10/2001 | Pecho et al. ........... 296/107.01 |
| 6,390,530 | B1 | * | 5/2002 | Maass .................... 296/107.09 |
| 6,390,531 | B1 | * | 5/2002 | Schutt .................... 296/107.13 |
| 6,412,860 | B1 |   | 7/2002 | Reinsch ...................... 296/219 |
| 6,416,121 | B1 |   | 7/2002 | Miklosi ....................... 296/219 |
| 6,464,284 | B2 | * | 10/2002 | Neubrand .............. 296/107.07 |
| 6,520,560 | B2 | * | 2/2003 | Schutt et al. .......... 296/107.09 |
| 6,568,751 | B2 | * | 5/2003 | Reinsch ................. 296/107.09 |
| 6,637,802 | B2 | * | 10/2003 | Obendiek ................... 296/108 |
| 6,666,494 | B2 | * | 12/2003 | Antreich ................ 296/107.09 |
| 6,692,061 | B1 | * | 2/2004 | Willard ................. 296/107.09 |

FOREIGN PATENT DOCUMENTS

| DE | 4203228 | 8/1993 |
| DE | 19939954 | 3/2001 |
| DE | 19942428 | 3/2001 |
| DE | 19942426 | 4/2001 |
| DE | 10023864 | 11/2001 |
| DE | 19944615 | 12/2001 |

OTHER PUBLICATIONS

Seifert, "Cabriolet mit Schiebedach", Article from the Journal "Motor—Rundschau", 1961 issue No. 13, (see specification).

* cited by examiner

Primary Examiner—Kiran Patel
(74) Attorney, Agent, or Firm—Davidson, Davidson & Kappel, LLC

(57) ABSTRACT

A top for a convertible vehicle includes a lateral roof frame having at least one front roof frame (1) and one rear roof frame part (2), a front bow (3) held in a longitudinally displaceable manner on the front roof frame part (1), a bow element (3) held on the front roof frame part (1), and a front frame (8) of the convertible vehicle, to which the front roof frame part (1) can be releasably locked. A movement of the front bow (3) from a first opening position into a second opening position and unlocking of the front roof frame part (1) from the front frame (8) are coupled by a positive control.

12 Claims, 14 Drawing Sheets

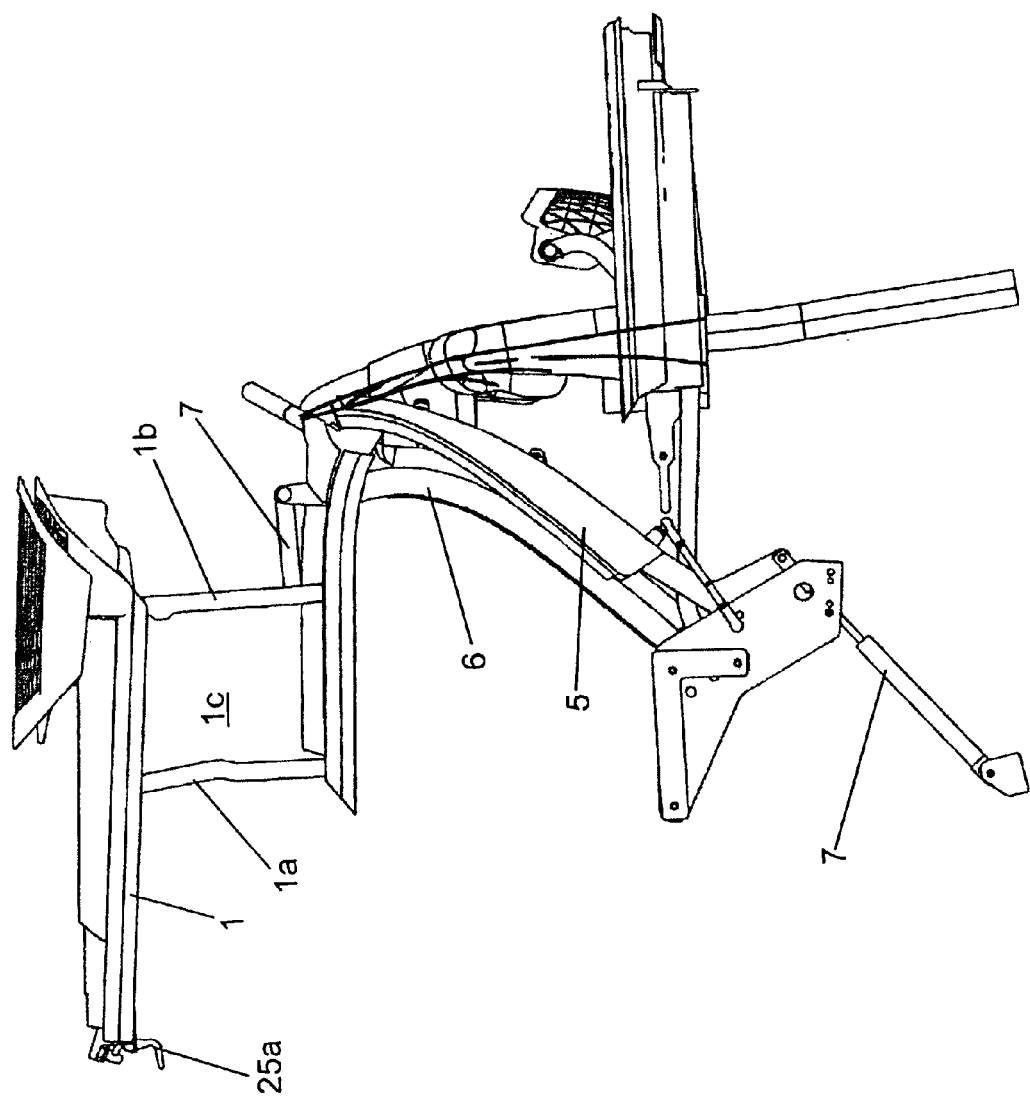
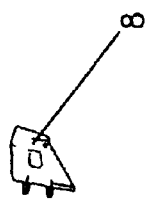
Fig. 4

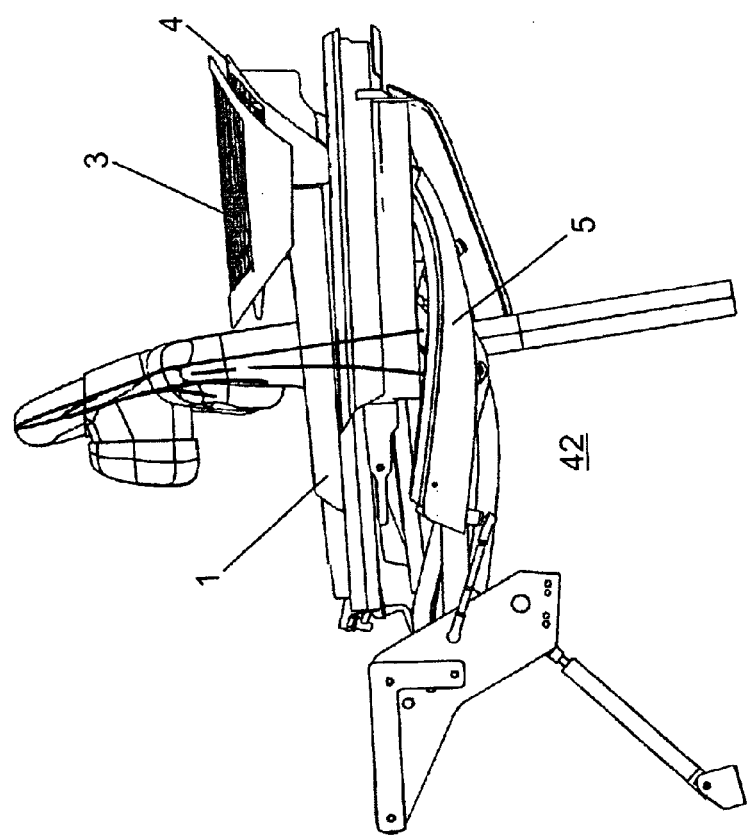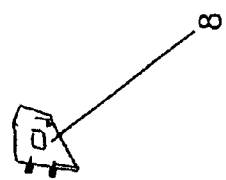
Fig. 5

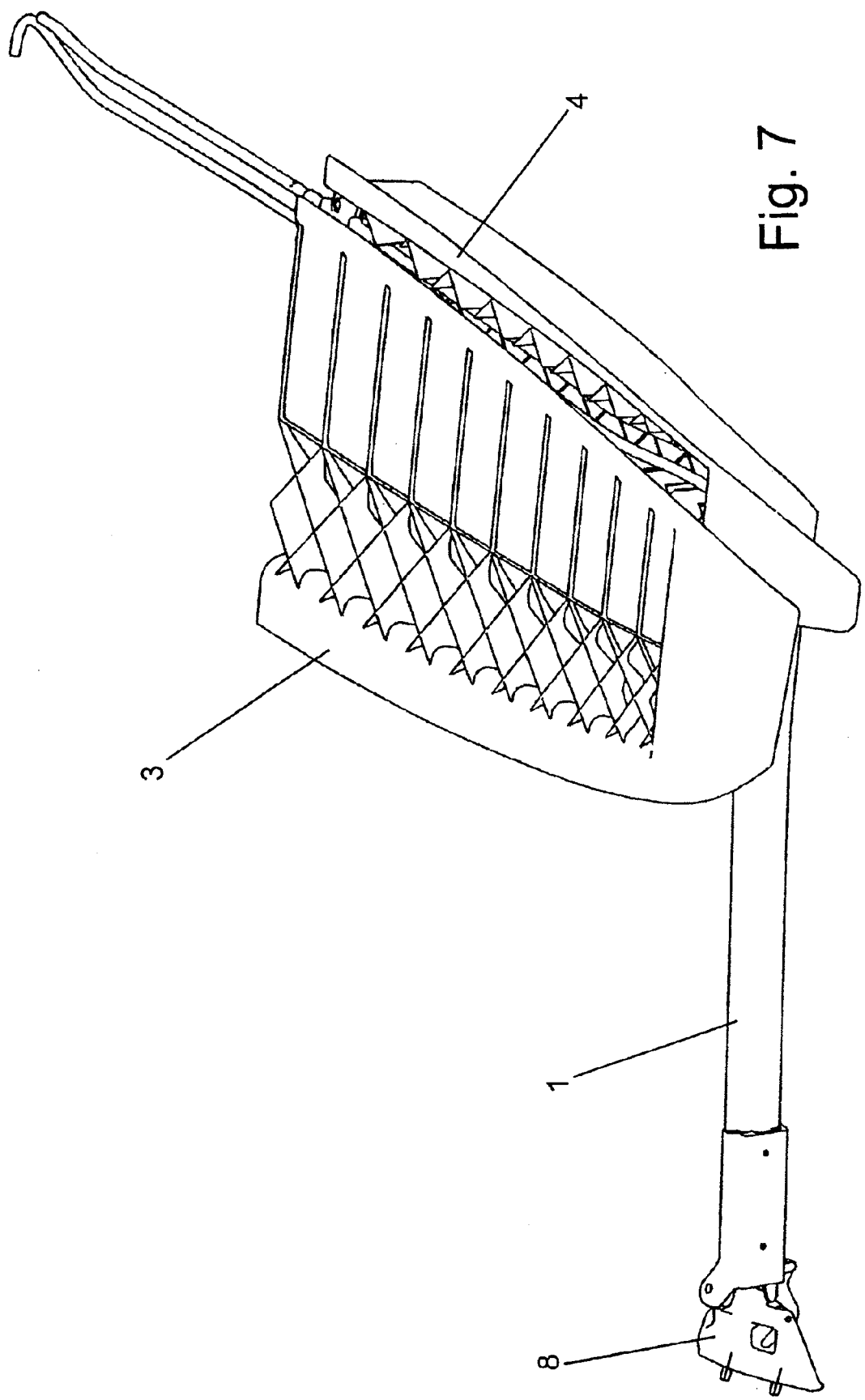

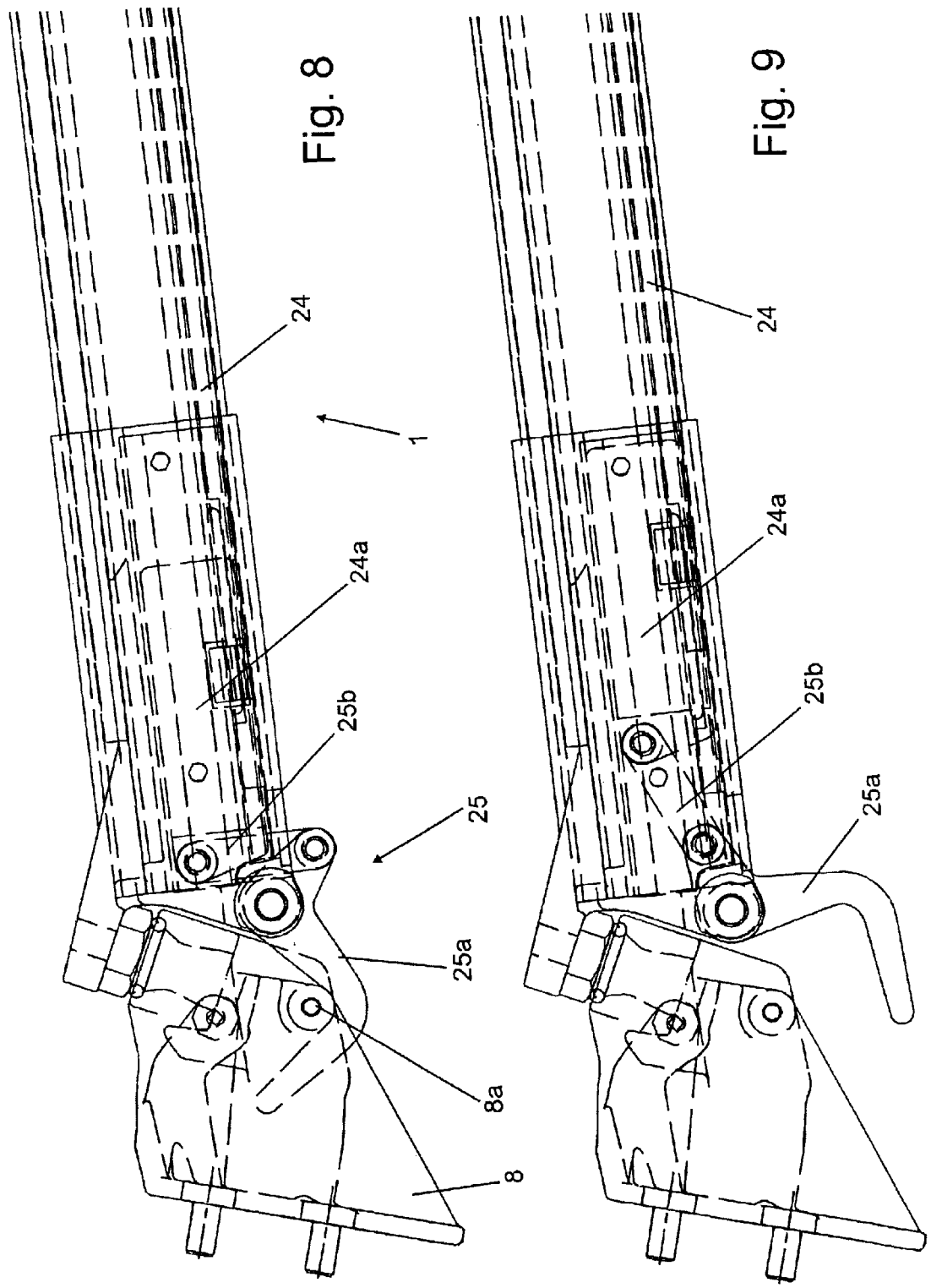

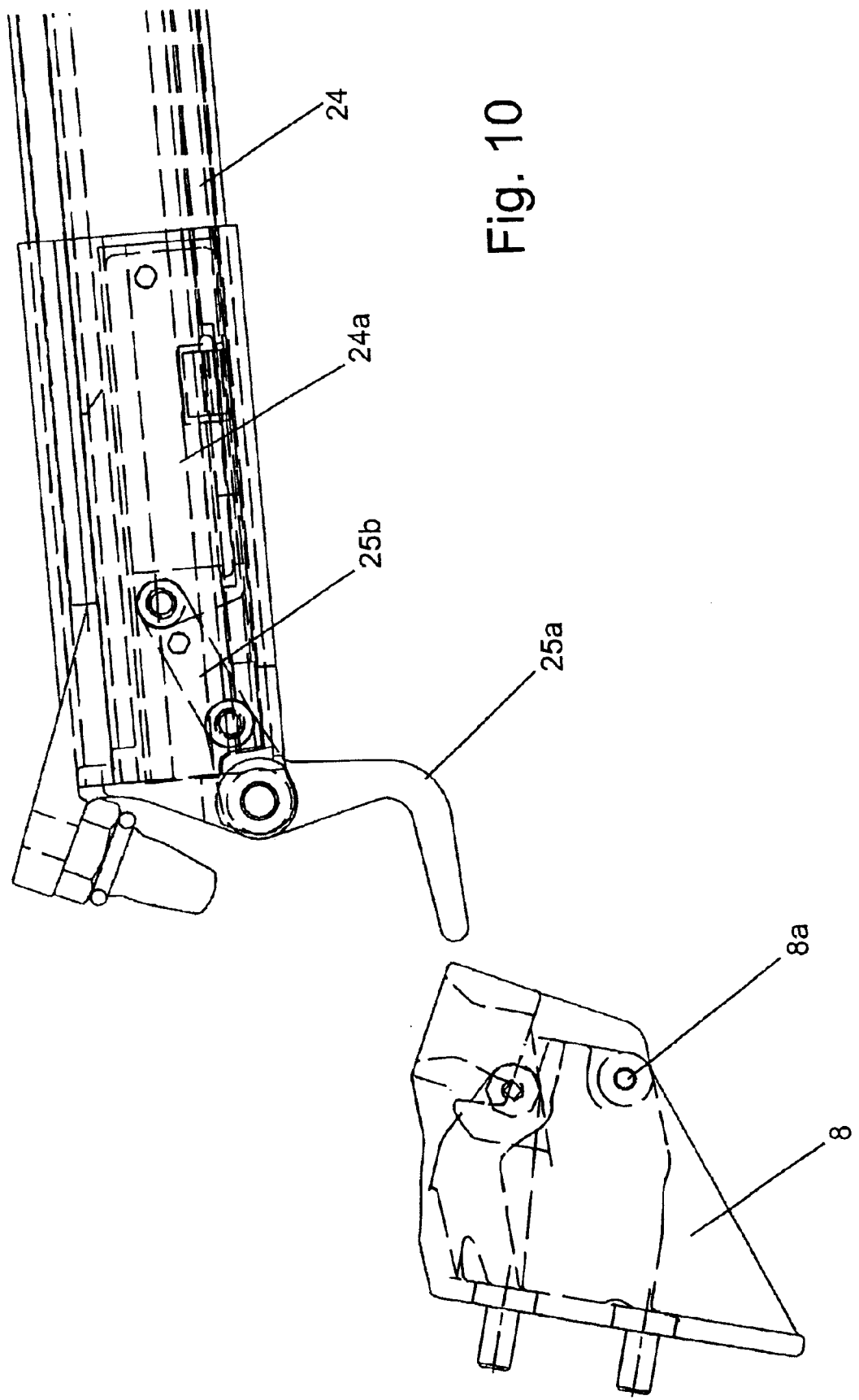

TOP FOR A CONVERTIBLE VEHICLE

The invention relates to a top for a convertible vehicle, comprising a lateral roof frame having at least one front roof frame part and one rear roof frame part arranged behind it; a front bow held in a longitudinally displaceable manner on the front roof frame part and a bow element held on the front roof frame part, the front roof frame part being able to be releasably locked to a front frame of the convertible vehicle.

In the construction of modem convertible vehicles, interest is increasingly being paid to tops which provide a combination of a completely openable top with a top linkage and a top canvas and also an integrated sliding top in order to provide the possibility of a partial opening of the top which can be used in the driving mode of the vehicle.

An article from the journal "Motor-Rundschau", 1961., issue number 13, describes a convertible developed by Reutter Company based on the "Citroen DS-19" vehicle. A convertible top which is known per se is extended here by a solution for a sliding roof, in which a front part of the top canvas can be displaced by means of a bow guided in lateral roof frame parts and can therefore be opened.

DE 42 03 228 C2 describes a top, in which a front roof part guided in lateral roof parts can be pushed back, with the lateral roof parts being held on a rear roof part and being storable together with the rear roof part and the front roof part in a rear region of the vehicle in order to obtain complete opening of the top.

DE 199 39 954 describes a convertible top, in which a front bow which is connected to the top cloth and is shaped as a shell part is held displaceably in guides formed on lateral roof frame parts, with the result that a partial opening of the top can be produced by displacing the front bow rearward. In the case of a complete opening of the top, the front bow can be stored together with the roof frame parts in a rear region of the vehicle.

DE 199 42 426 describes a convertible top, in which a front bow which is connected to the top cloth and is shaped as a shell part is held displaceably in guides formed on lateral, front roof frame parts, with the result that a partial opening of the top can be produced by displacing the front bow rearward. The front roof frame parts are articulated on rear roof frame parts via rotational joints in such a manner that, in the case of complete opening of the top, they are pivoted sideways into a position which is essentially parallel to the front bow. The top canvas is additionally fixed on a displaceable central bow, with, firstly, the front bow being displaceable over the central bow and, secondly, the front bow and the central bow being displaceable together in the rear direction of the vehicle during the course of complete opening of the top. Although the displacement together of the two bows to the rear has the effect that the bows take up little space in the longitudinal direction of the vehicle in the stored state of the top, the displaceable design of the central bow makes a complex mechanism necessary, since the central bow has to be releasably fixable at least in its pushed-forward position. In addition, additional guide rails which extend beyond the front roof frame parts toward the rear roof frame parts are required.

DE 199 42 428 describes a top for a convertible vehicle, in which a front bow which can be displaced in order to obtain a partial opening of the roof can be held in a different manner either in guides in front roof frame parts or fixed on displaceable, front roof frame parts. In the case of being held in guides of the front roof frame parts, the front roof frame parts are connected in an articulated manner to the rear roof frame parts, with the result that they can be folded in relative to the rear roof frame parts either sideways in a horizontal plane or in a vertical plane in the longitudinal direction of the vehicle. In this case, the front bow can be connected to the roof frame parts via links, with the result that the roof frame parts are folded in by a movement of the front bow. Although an interaction of the displacing movement of the front bow with locking of the roof frame parts to a front frame of the vehicle is mentioned, it is not shown in its technical detail.

The object of the invention is to improve a top of the type mentioned at the beginning for a convertible vehicle to the effect that an overall simple and cost-effective, drivable top mechanism is combined with a particularly space-saving storage position in the rear region of the vehicle.

This and further objects are achieved by the present invention.

A top according to the invention comprises a lateral roof frame having at least one front roof frame part and one rear roof frame part; a front bow held in a longitudinally displaceable manner on the front roof frame part, a bow element held on the front roof frame part, and a front frame of the convertible vehicle, to which the front roof frame part can be releasably locked, in which a movement of the front bow from a first opening position into a second opening position and unlocking of the front roof frame part from the front frame are coupled by a positive control.

In this case, unlocking of the front roof frame part from the front frame of the vehicle is advantageously brought about by a mechanism coupled to the front bow, in such a manner that the front bow is moved in the course of the unlocking process from a first opening position, which is preferably associated with an opening in the manner of a sliding roof, into a second opening position, which is associated with the complete opening of the top. The second opening position is situated here behind the first opening position in the direction of travel, so that the front bow, when the front roof frame parts are being unlocked, is moved a particularly good distance to the rear and preferably over the bow element, which assists in leaving the rear passenger region free in the completely opened state of the top.

The positive control preferably comprises a hoop element connected to the front bow and a catch element which is held displaceably on the front roof frame part and has a rocking lever, which enables the positive control to be of particularly small and cost-effective design. In this case, the front bow and the hoop element can particularly preferably be movable in a drivable manner via a driven cable, as a result of which a small, cost-effective and flexibly adaptable drive is used.

The catch element is preferably in operative connection via a driven cable, a rod or a similar, elongate connecting element to a hook which is articulated pivotably in the end region of the front roof frame part and forms part of a locking element of the front roof frame part, which locking element can be locked to the front frame of the vehicle, so that engagement of the hoop element in the catch element ultimately produces an operative connection between the front bow and the locking of the front roof frame part. In this case, the connecting element is particularly preferably not connected directly to the hook, but rather via a hook link. The hook link is articulated on one side on the hook, and on the other side on the front roof frame part. This advantageously achieves, firstly, the possibility of a lever action or a configurable force transmission function and, secondly, securing of the hook in the locked state by means of a position beyond the dead center with respect to the hook element.

As an alternative to this, a preferred embodiment of a top according to the invention can also consist in that no movement at all of the front bow is associated with the unlocking or, in a kinematic reversal, with the locking of the front roof frame parts to the front frame. One advantage in this alternative is that the partial roof opening in the manner of a sliding roof can be designed to be larger, since the front bow can already be moved as far as the stop on the bow element during the opening of the sliding roof without a further movement path correlated with the unlocking of the front roof frame parts having to be provided. A technical realization of this alternative can be achieved, for example, by the provision of a second combination of a catch element and a hoop element. Then, for example, during an opening movement of the top, first of all, in the course of a linear driven movement of a driver a first catch element would be released and the front bow would therefore be disengaged from the driver, with, at the same time or subsequently, a second catch element associated with the unlocking of the roof frame parts being disengaged. The corresponding closing movement proceeds in a kinematic reversal. The device could therefore likewise manage with the use of only a single, linear drive, such as a driven cable, for driving both the front bow and the releasable locking of the front roof frame parts.

A further top according to the invention comprises a lateral roof frame having at least one front roof frame part and one rear roof frame part; a front bow held in a longitudinally displaceable manner on the front roof frame part; a bow element held on the front roof frame part; and a front frame of the convertible vehicle, to which the front roof frame part can be releasably locked, the longitudinally displaceable holder for the front bow on the front roof frame part comprising a linear guide and link mechanism, and in which the front bow being able to be pivoted upward by means of the link mechanism during an opening operation.

In this case, an opening movement of the front bow is advantageously achieved which, on the one hand, comprises a longitudinal displacement along the linear guide and, on the other hand, a pivoting upward by means of the link mechanism, with the pivoting upward subsequently enabling the bow element to be passed over in a simple manner.

The link mechanism preferably comprises a supporting link fixed on the front bow and a pivoting hook which can be brought into connection with a hoop of the front frame, so that the front bow is additionally held securely on the front frame in its closed position.

In addition, a drivable, first slider, a second slider and a third slider are particularly preferably held in a longitudinally displaceable manner in the linear guide, with the supporting link and an intermediate link being connected in an articulated manner to the second link via a link plate, with the intermediate link being connected in an articulated manner to the pivoting hook and the pivoting hook being connected in an articulated manner to the second slider, and with the pivoting hook being connected to the first slider via a control link. This advantageously achieves a complex combination of a pivoting and displacing movement of the front bow and, at the same time, locking of the front bow to the front frame in a space-saving manner with a small number of components.

In a particularly preferred embodiment, the front roof frame part can advantageously be pivoted in the same orientation over the rear roof frame part, this preferably being achieved through a parallel pivoting by means of a four-bar linkage which is formed by the front and the rear roof frame links and by a first and second link which are articulated in each case on the front and on the rear roof frame parts. The bow element, to which the top cloth is preferably fixed, can therefore be fixed rigidly to the front roof frame parts, with, nevertheless, an advantageously joint displacement of the front bow and bow element rearward being possible. By means of this displacement rearward in the course of complete opening of the top, sufficient space is maintained in the rear region for the rear passengers.

The front roof frame part, the rear roof frame part and a pillar element articulated on the rear roof frame part and on the vehicle body particularly preferably together form a roof frame, with a main link connecting the body to the rear roof frame part and a control link connecting the main link to one of the two links of the four-bar linkage associated with the front roof frame part being added to the roof frame to give a linkage which is positively controlled in its entirety.

Complete opening of the top can preferably be driven by means of a driving device, with it being possible, in particular in the case of the top linkage being designed as a positively controlled linkage, for a simple, linear force-introducing unit which is supported against the vehicle body to be provided.

Further advantages and features emerge from the exemplary embodiment described below and from the dependent claims.

A preferred exemplary embodiment of a top according to the invention will be described below and explained in greater detail with reference to the attached drawings.

FIG. 4 shows the top from FIG. 1 in a second step of an opening movement of the top.

FIG. 5 shows the top from FIG. 1 in a completely opened position stored in a rear region of the vehicle.

FIG. 7 shows a perspective view of a front part of the top from FIG. 1 in a partially opened position.

FIG. 8 shows a detailed view of a front roof frame part of the top from FIG. 1 in a closed position.

FIG. 9 shows a detailed view of a front roof frame part of the top from FIG. 1 in an unlocked position.

FIG. 10 shows a detailed view of a front roof frame part of the top from FIG. 1 in an unlocked position and moved away from a front frame of the vehicle.

The top kinematic described below is designed essentially symmetrically with respect to the longitudinal central plane of the vehicle, and so generally only the kinematics of one side of the vehicle will be described.

Figure 1:
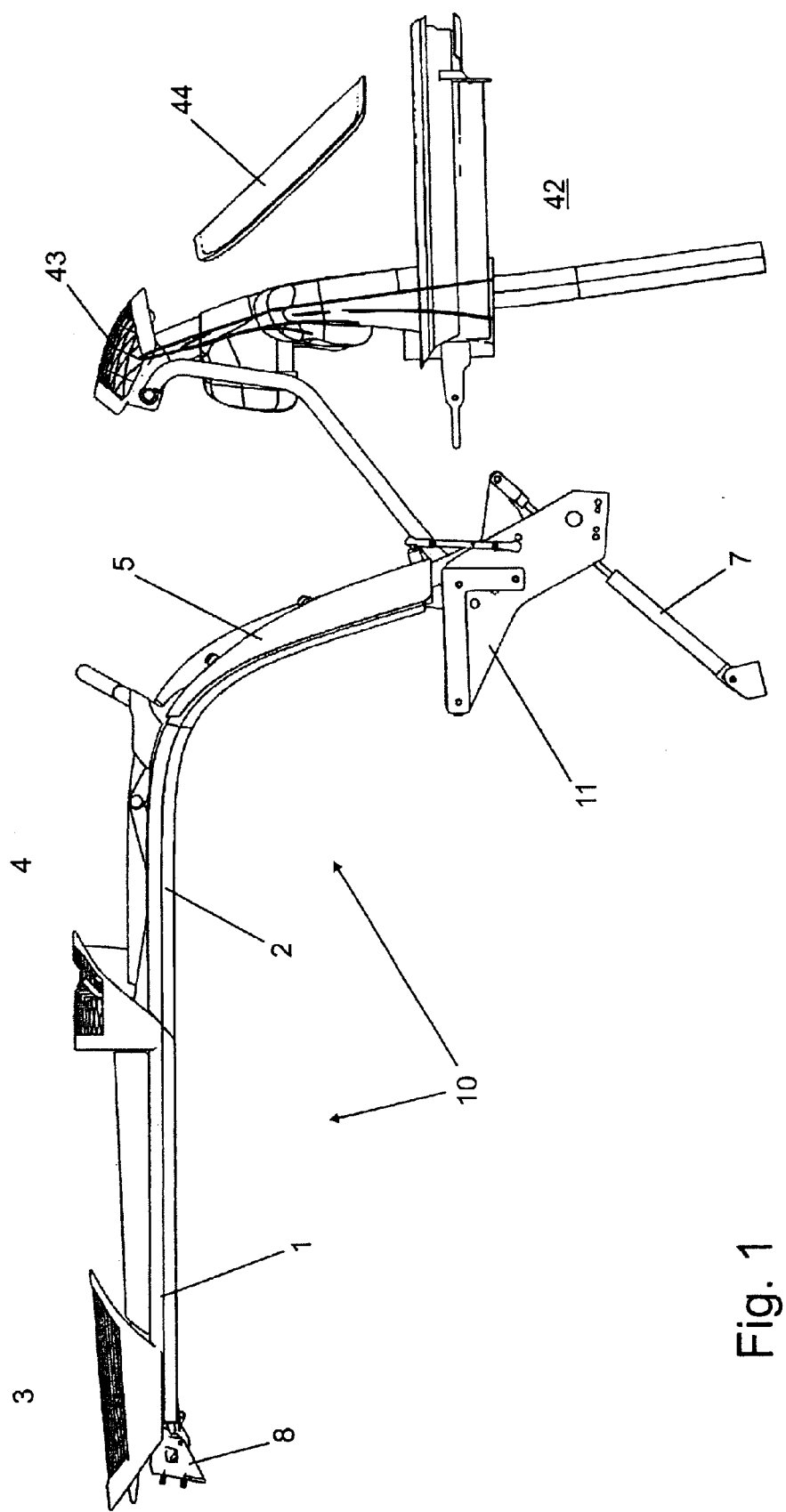
FIG. 1 shows a schematic side view of a top according to the invention in a completely closed state.
Figure 20:
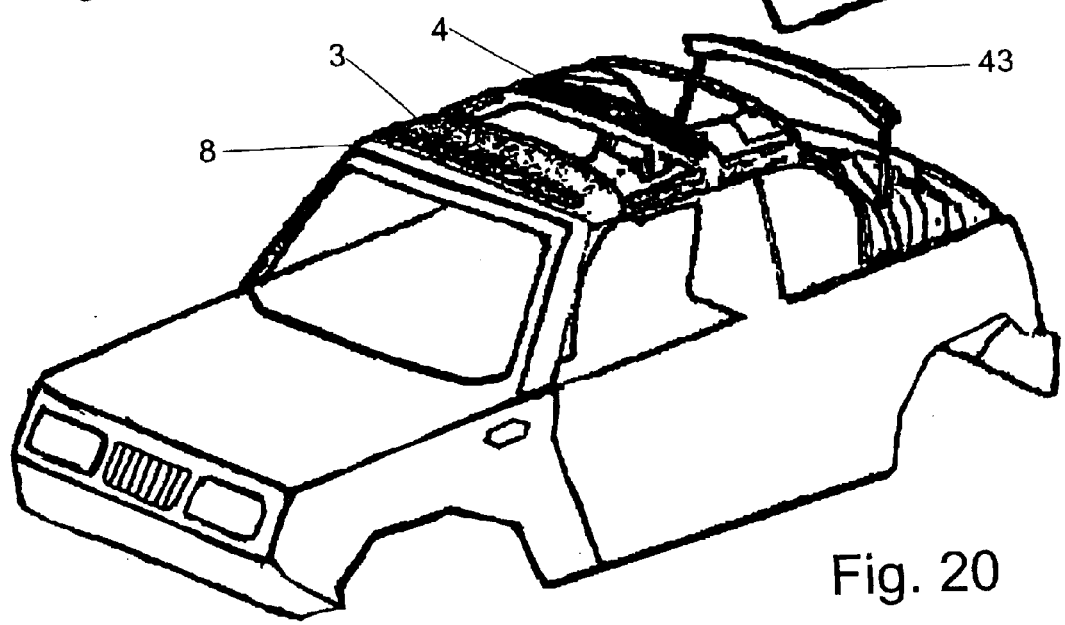
FIG. 20 shows a perspective view of the top from FIG. 1 in a closed position.

The top which is shown in FIG. 1 and in a perspective view in FIG. 20 for a convertible vehicle comprises a main bearing 11 which is fixed on the body and on which a roof frame 10 is articulated in a pivotable manner. The roof frame 10 is designed as a linkage chain, which is positively controlled in its entirety, and comprises, starting from the main bearing 11, first of all a pillar element 5 which, in the closed state of the top, forms a B-pillar of the vehicle, a rear roof frame part 2 which is articulated thereon and, right at the front in the direction of travel, a front roof frame part 1 which is fixed releasably to a front frame 8 of the vehicle, said front frame being designed as a windshield frame. In addition, in order to obtain a positively controlled linkage, further links are provided, as FIG. 4 in particular shows. The rear roof frame part 2 is thus positively controlled via an articulated main link 6 which is also articulated in the region of the main bearing 11. At an extension part which extends over its articulation on the rear roof frame part 2, the main link 6 is connected in an articulated manner to a control link 7.

The front roof frame part 1 is connected via a first link 1a and a second link 1b to the rear roof frame part 2 in such a manner that a four-bar linkage 1c is formed, with the front roof frame part 1 forming a coupler, the rear roof frame part 2 forming a base and the first and second links 1a, 1b forming the two links of the four-bar linkage 1c. In order to activate the four-bar linkage 1c, the control link 7 is fixed in an articulated manner on the second link 1b, as a result of which the linkage, which is positively controlled in its entirety, is closed.

A linear force-introducing unit 7 which is supported, at one end, on the vehicle body and engages, at the other end, on an elongated part of the pillar element forms a driving device for the above-described top kinematics.

The top has, in its front region, two elements which are essentially formed as hard plastic shell parts, namely a front bow 3 and a bow element 4. The top cloth of the convertible top is fixed both to the front bow 3 and also to the bow element 4. The front bow 3 is held in a longitudinally displaceable manner in linear guides or guide rails 40 (see in particular FIG. 15 to FIG. 18) provided on the front roof frame parts 1. In a completely closed state of the top, the front bow 3 is displaced forward to the maximum extent in the direction of travel and bears on the front frame 8. The bow element 4 is connected fixedly to the front roof frame parts 1 and thus forms a type of fixed bridge between the left-side and right-side, front roof frame part 1.

Furthermore, the top comprises a rear bow 43 and a rigid rear window 44 accommodated in the top canvas.

In a partially opened state of the top (see FIG. 2), the front bow is displaced to the rear in order to release an opening of the top in the manner of a sliding roof and is offset slightly upward, so that it engages over the bow element 4. In this state, the top canvas, which previously extended tautly between the front bow 3 and bow element 4, is in a loose, S-shaped curve (not illustrated) between the front bow 3 and the bow element 4, which is now situated essentially under the front bow. From the bow element 4 rearward, the top canvas is tightened as before, since it is fixed to the bow element 4.

Figure 2:
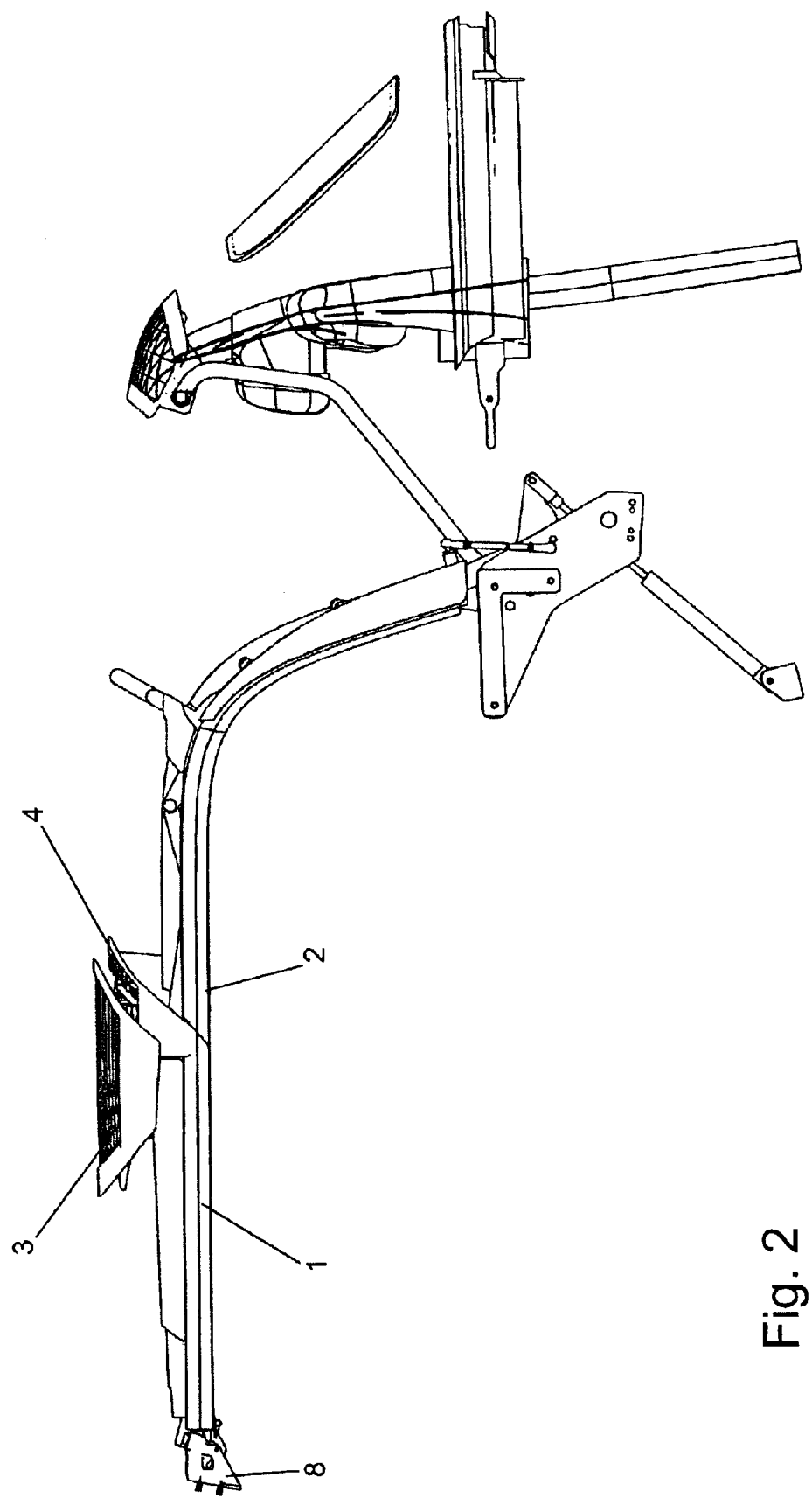
FIG. 2 shows the top from FIG. 1 in a partially opened position, in which the front top part has been opened in the manner of a sliding roof and in a manner permitting driving.

In the partially opened state of the top according to FIG. 2, the front roof frame parts 1 are locked to the front frame 8 in a similar manner as in the closed state of the top, with the result that the roof frame 10 is also stable in a manner permitting driving in the partially opened state.

Figure 3:
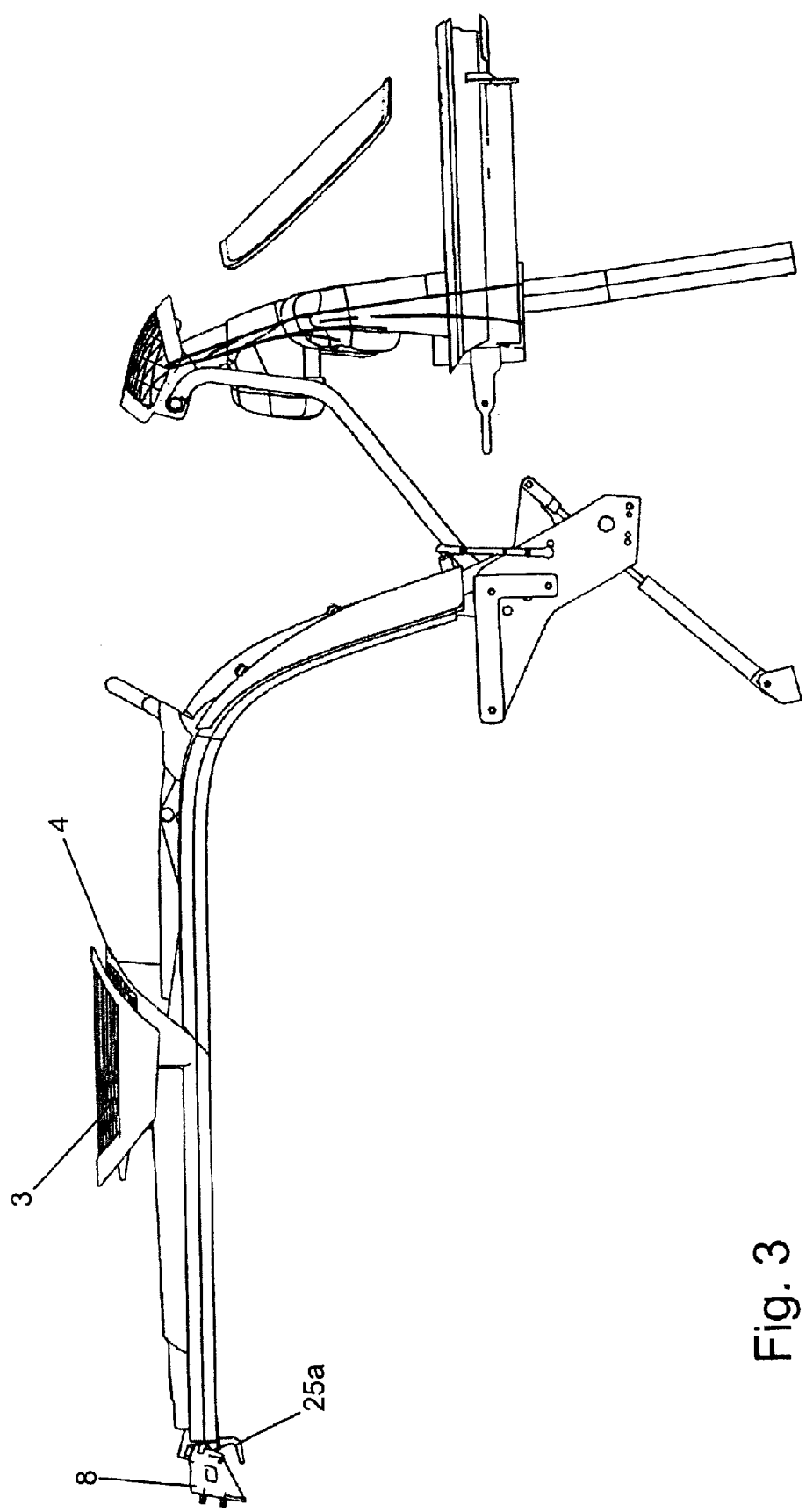
FIG. 3 shows the top from FIG. 1 in a first step of an opening movement of the top, in which a locking of front roof frame parts to a front frame of the vehicle is unlocked.

FIG. 3 shows the roof frame 10 essentially still as in FIG. 2, but the front bow is in a position displaced to the rear to the maximum, and the front roof frame parts 2 are unlocked from the front frame 8. A hook 25a can now be seen disengaged from the front frame 8.

FIG. 4 shows an intermediate position of an opening movement of the top in order to obtain a complete opening of the convertible. In particular, the previously described construction of the positively controlled linkage can be seen particularly well in FIG. 4. In the course of the opening of the top, the front roof frame parts 1 are pivoted parallel over the rear roof frame parts 2 by means of the four-bar linkage 1c.

Figure 19:
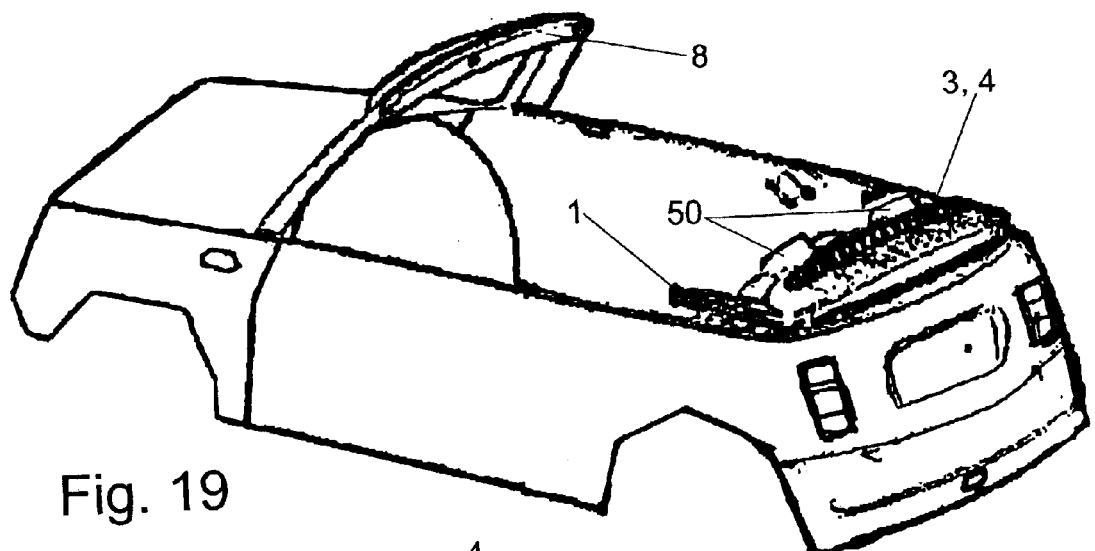
FIG. 19 shows a perspective view of the top from FIG. 1 in a completely opened position.

FIG. 5 shows a completely opened top stored in a rear region 42 of the vehicle. This position is also illustrated perspectively in FIG. 19. It can be seen, in particular, that the rearward displacement of the front roof frame parts 1 by means of the previously described pivoting of the four-bar linkage and the displacement of the front bow 3 on the rear side on the front roof frame parts 1 have the effect that the rear passengers, whose seat position can be seen by rear seats 50, are not obstructed by the stored top, but rather are seated in a position in which they have the pushed-back front bow 3 behind them and the stored, front roof frame parts 1 laterally next to them.

Figure 21:
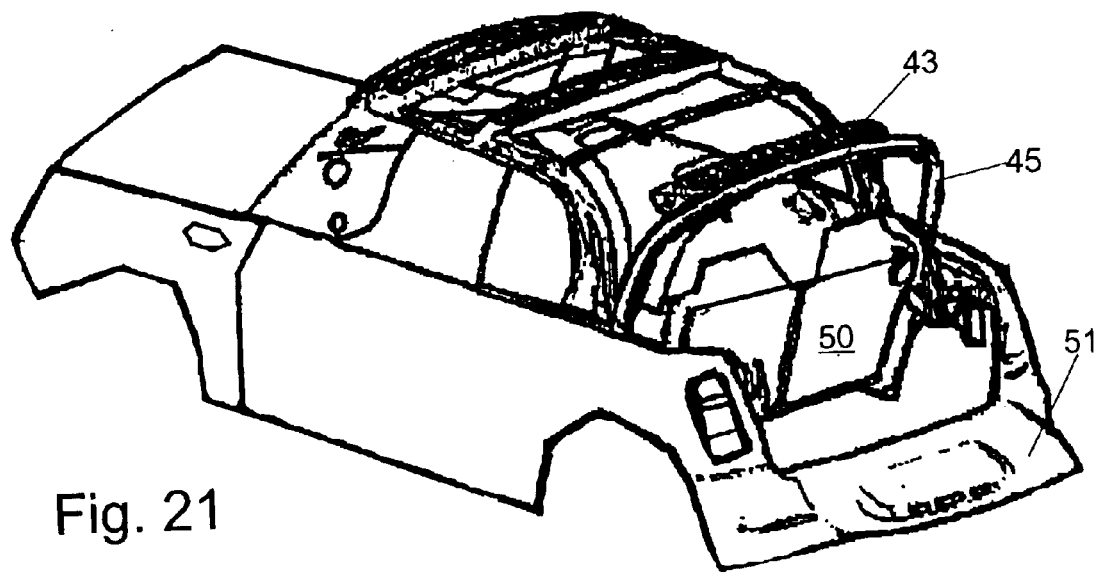
FIG. 21 shows a perspective view of the top from FIG. 1 in a closed position with a tension bracket moved upward for loading purposes.

A further advantageous characteristic of the top is shown in FIG. 21. In order, with the top closed, to make a loading volume at the rear of the vehicle accessible in an optimum manner, a tension bracket 45 forming the rear boundary of the top can be raised separately. The tension bracket thereby no longer constitutes a transverse strut which obstructs the loading, this being advantageous in particular in the case of the present vehicle, in which the rear edge of the top also constitutes a rear boundary of the entire vehicle body. In addition, a load cover 51 which can be pivoted open counter to the direction of travel and is essentially orientated vertically in the closed state is provided which, in the closed state, rests with its upper edge against the tension bracket 45 which has been pulled down.

In the following text, the mechanism assigned to the front bow 3 and to the locking of the front roof frame parts 1 will be described in greater detail.

Figure 6:
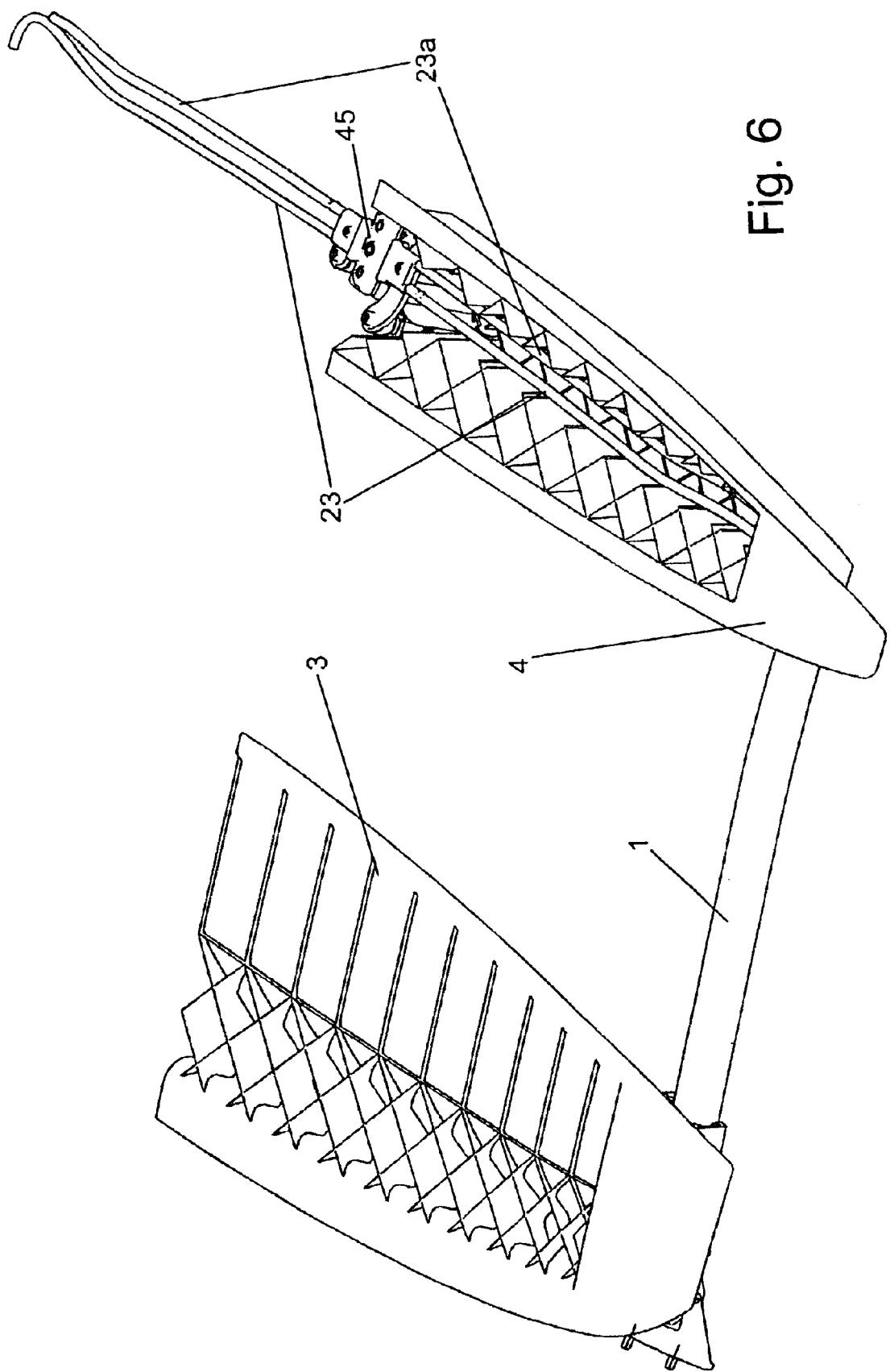
FIG. 6 shows a perspective view of a front part of the top from FIG. 1 in a closed position.

FIG. 6 and FIG. 7 show the front bow and the bow element 4, which is connected fixedly to the front roof frame parts behind the front bow 3, in a perspective illustration. In particular, it can be seen that a recess in the bow element, formed as a shell part, is used for accommodating a driving device 45, which is known per se, for driven cables. In the present case, the pinion of the driving device simultaneously drives an outward driven cable 23 and a return driven cable 23a, with in each case one of the driven cables 23, 23a being used for driving the displacement of the front bow and the locking and unlocking of the front roof frame parts 1 on the left and on the right side of the vehicle. Owing to the present symmetry of the drive, only the drive of one side of the vehicle will be described below.

FIG. 11 to FIG. 14 show an enlargement of a detail of a mechanism formed in the front roof frame part 1. The driven cable 23 is connected fixedly to a hoop element 20, guided on sliders or rollers, and to the front bow 3, with the result that a driving of the driven cable 23 directly displaces the front bow 3 and the hoop element 20 along its guide. In addition, a longitudinally displaceable catch element 21 which is likewise mounted on sliders or rollers is provided with a rocking lever mounted on it in a manner such that it can rotate about an axis essentially parallel to the transverse axis of the vehicle. The catch element protrudes over part of the driven cable 24, which can alternatively also be designed as a push and pull rod.

Figure 11:
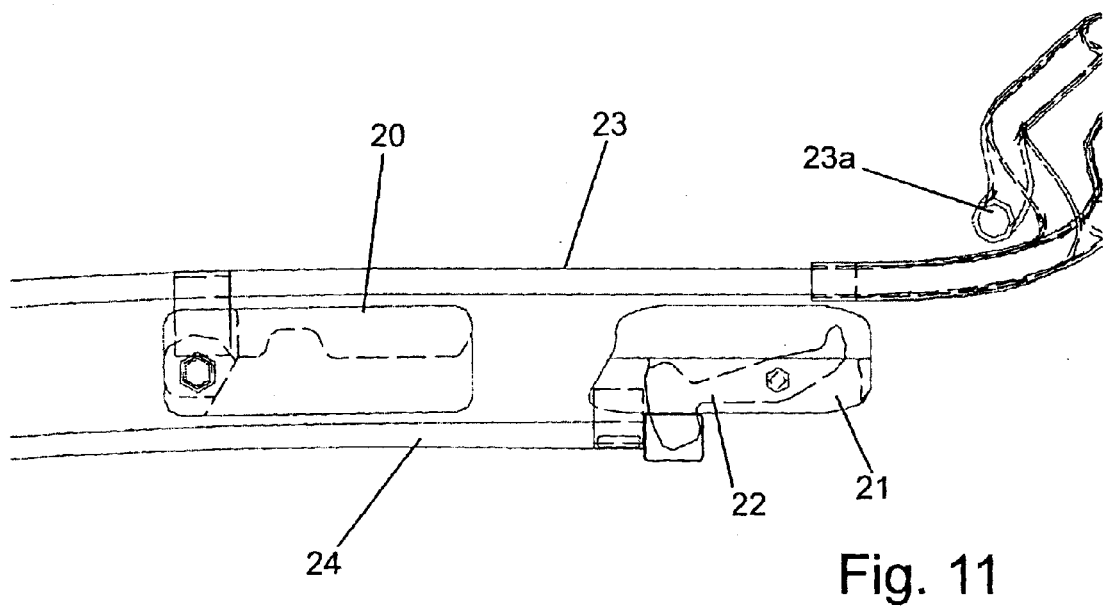
FIG. 11 shows a further detailed view of the front roof frame part from FIG. 8 in a closed position.
Figure 12:
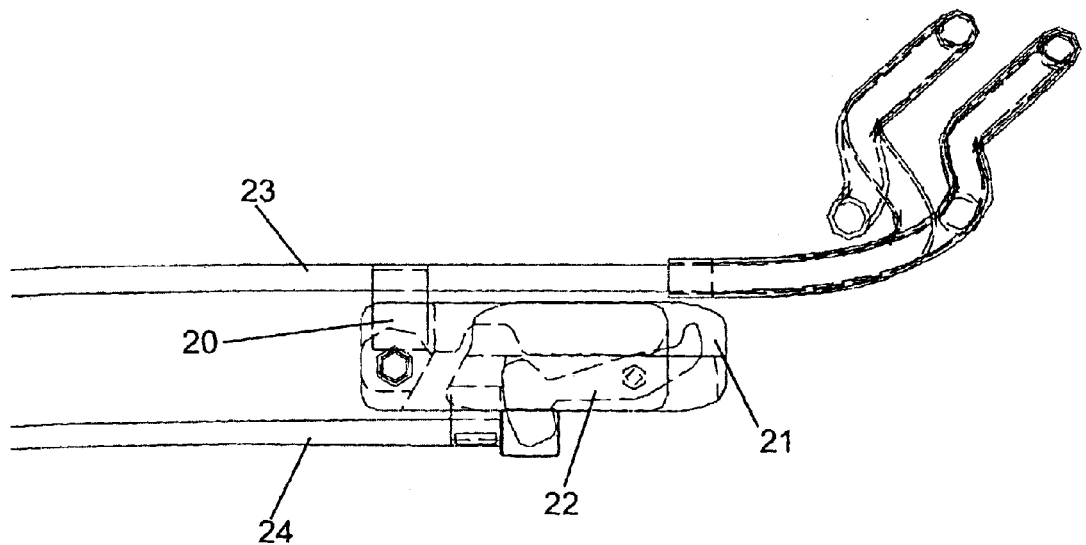
FIG. 12 shows the detailed view of the front roof frame part from FIG. 11 in a first step of an opening movement which corresponds to a partial opening of a front bow.
Figure 13:
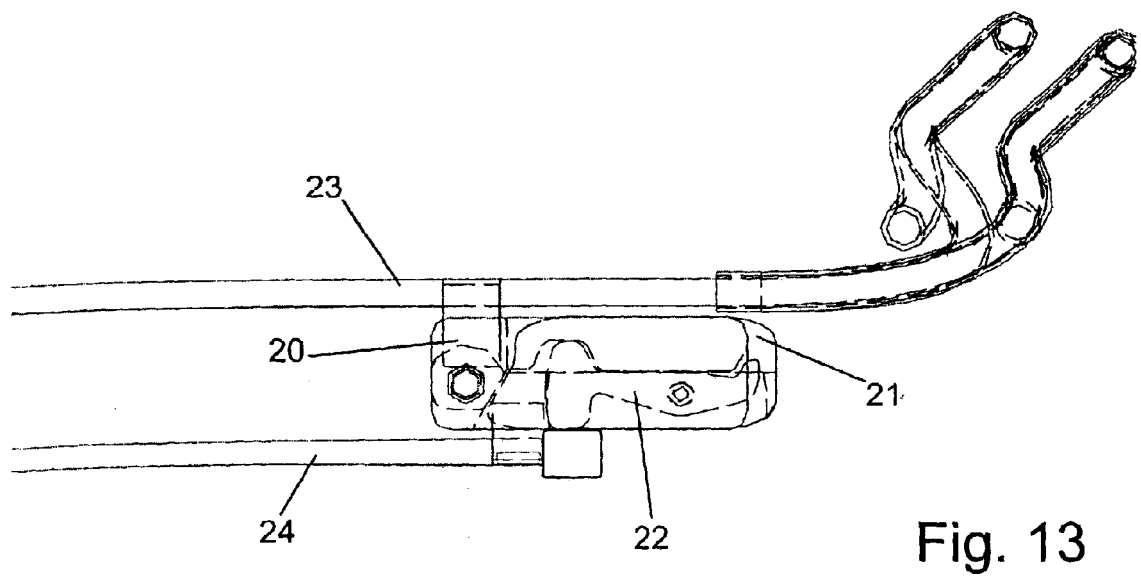
FIG. 13 shows the detailed view of the front roof frame part from FIG. 11 in a second step of an opening movement.
Figure 14:
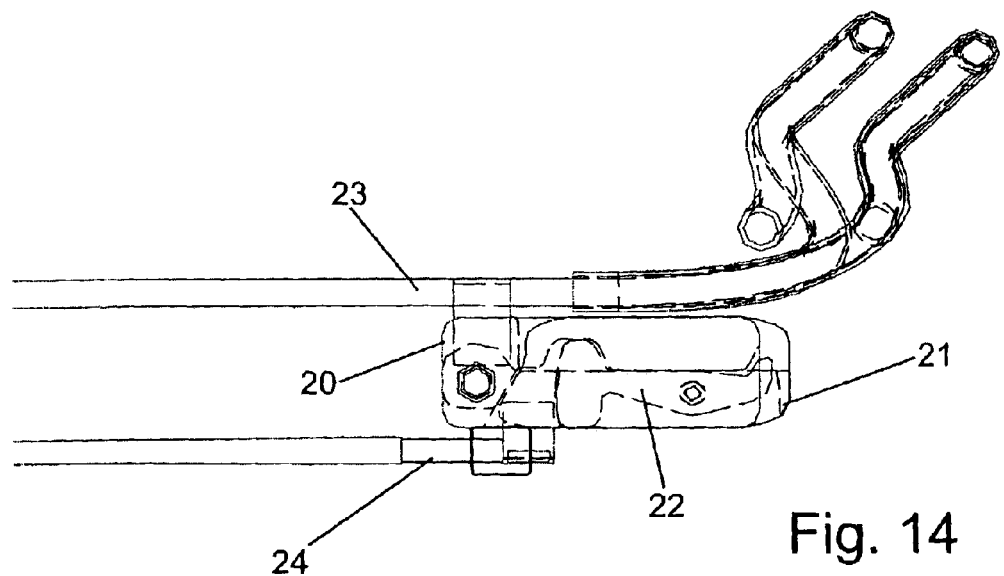
FIG. 14 shows the detailed view of the front roof frame part from FIG. 11 in a position in which the roof frame part is unlocked.
Figure 15:
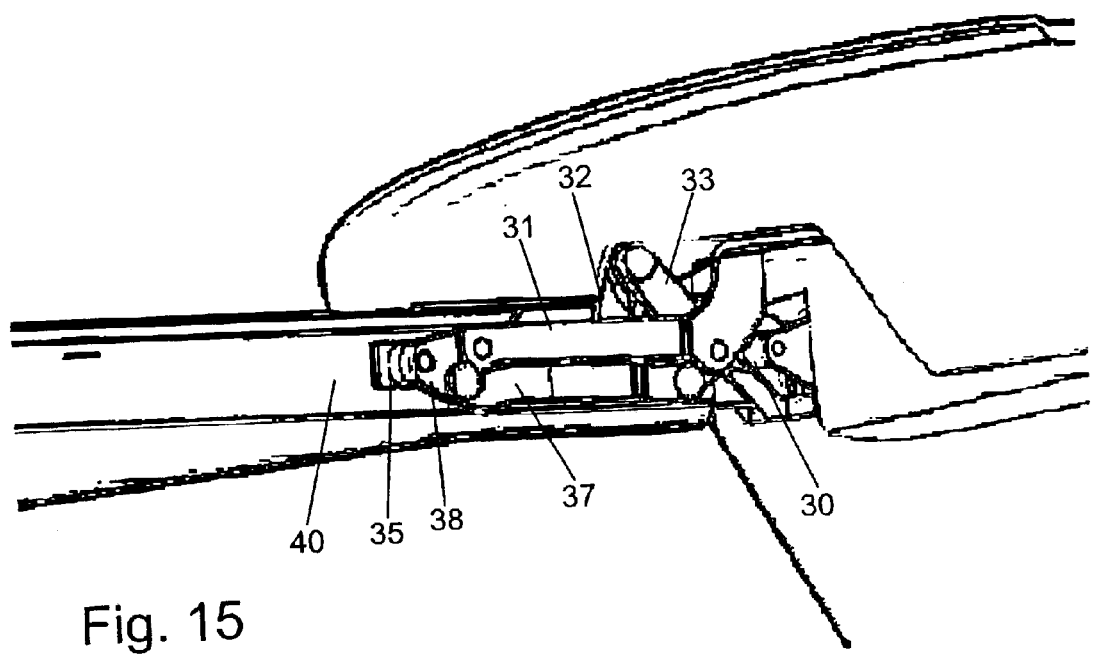
FIG. 15 shows a perspective detailed view of the top from FIG. 1, in which a link mechanism connected to a front bow is illustrated, and in which the front bow is in a closed position and is fixed to a front frame of the vehicle.
Figure 16:
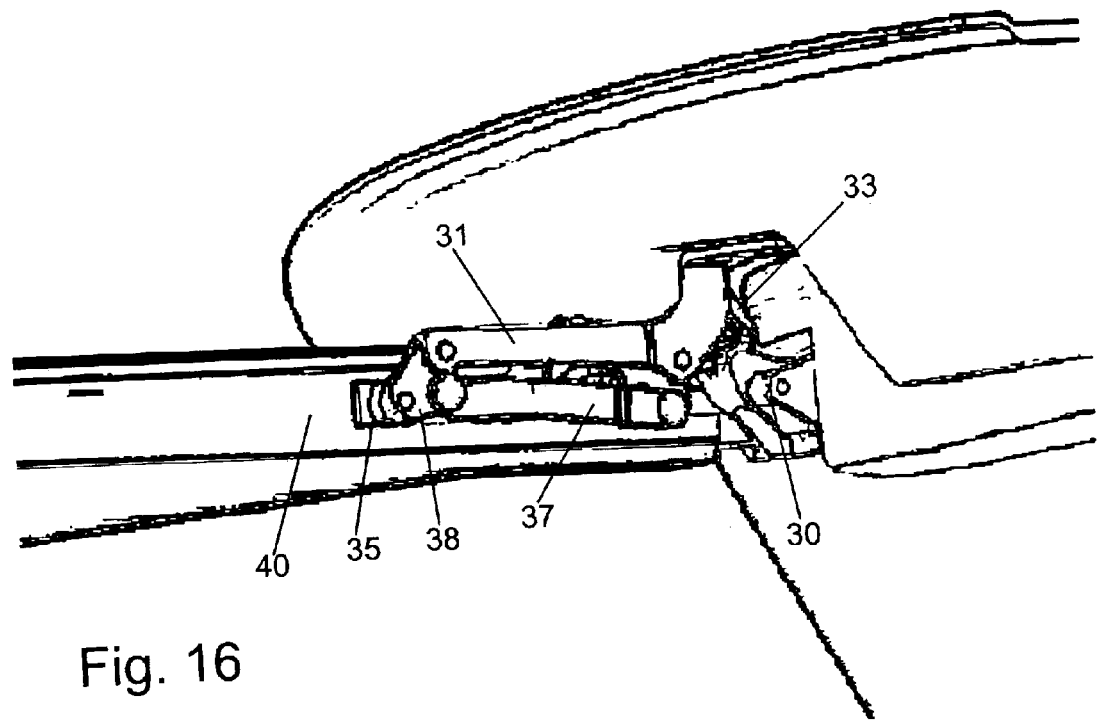
FIG. 16 shows the detailed view from FIG. 15 in a first step of an opening movement of the front bow.
Figure 17:
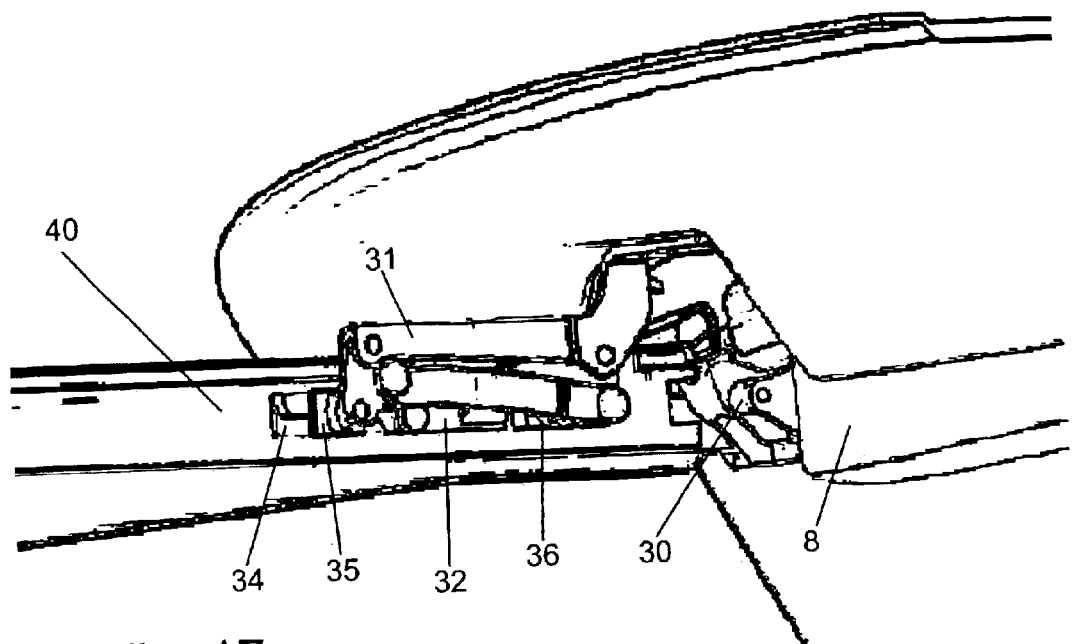
FIG. 17 shows the detailed view from FIG. 15 in a second step of an
opening movement of the front bow.
Figure 18:
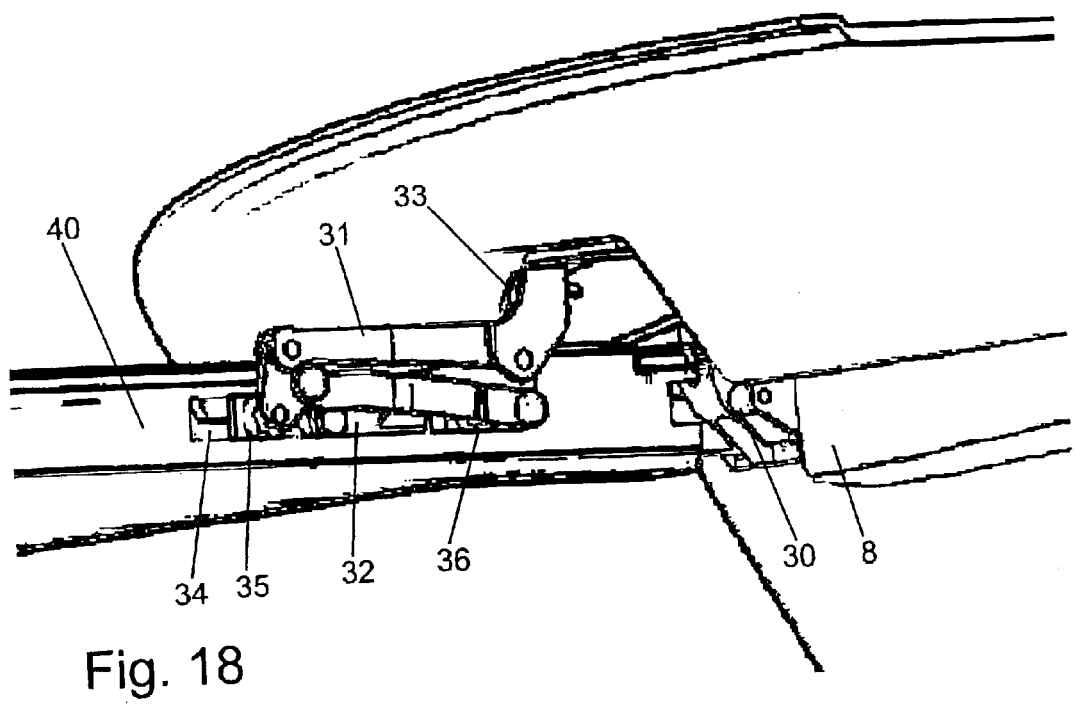
FIG. 18 shows the detailed view from FIG. 15 in a third step of an opening movement of the front bow.

In the position shown in FIG. 11, the front bow 3 is in a position in which it is pushed forward (on the left in the drawing) and which is associated with the completely closed top, and the front roof frame part 1 is also locked to the front frame 8. Movement of the driven cable to the right then causes the front bow 3 to move in the rear direction of the vehicle. In FIG. 12, the front bow has then assumed a first opening position in which the hoop element 20 has been pushed up to the catch element 21 but is not yet in engagement therewith. Further displacement of the driven cable 23 to the right now causes the rocking lever 22 to move, by the hoop element 20 striking against a formation on the rocking lever 22, with the result that a formation on the rocking lever 22 which is located at the other end and is formed in the manner of a hammer head engages in a recess of the hoop element 20 (see FIG. 13). On further displacement of the driven cable 23 to the right, the hoop element 20 and catch element 21 are now in engagement by means of the rocking lever 22. A slight displacement to the right causes the formation on the rocking lever in the manner of a hammer head to move away from a cutout on the lower side, in which it was located in its position according to FIG. 11 and FIG. 12, with the result that the rocking lever 22 is now blocked against pivoting back by means of the rail guide located below the rocking lever. In this state, the hoop element and catch element 21 are therefore in non-positive engagement both on the pull side and on the push side, this being of significance for the reversibility of the kinematics in respect of a later closing of the front bow 3 with simultaneous locking of the front roof frame parts 1. Further movement of the driven cable 23 to the right now causes the catch element 21 and, together with the latter, the driven cable 24 to move to the right at the same time, this being used to initiate an opening movement and/or unlocking of the front roof frame part 1. FIG. 14 shows the final state, in which the front bow 3 has been displaced completely to the right (see, for example, also FIG. 3) and in which the front roof frame part 1 is unlocked from the front frame 8.

FIG. 8 to FIG. 10 show the process of unlocking the front roof frame part 1, which is driven by the driven cable 24 moved at the same time, in a detailed illustration. The driven cable 24 is fixedly connected on the end side to a sliding element 24a. The sliding element 24a belongs to a locking element 25 which furthermore comprises a hook 25a articulated pivotably on the front roof frame part 1 and a hook link 25b, which is articulated at one end on the hook 25a and at the other end on the sliding element 24a. In a locked state, the hook 25a interacts with a hoop roller 8a fixed on the front frame 8. Firstly, an advantageous deflection of force can be obtained by the articulation of the hook 25a by means of the hook link 25b and, secondly, in a locked state (see FIG. 8), the hook 25a can advantageously be arranged in a secured position beyond the dead center with regard to the hook link 25b.

What is claimed is:

1. A top for a convertible vehicle, comprising
   a lateral roof frame (10) having at least one front roof frame part (1) and one rear roof frame part (2);
   a front bow (3) held in a longitudinally displaceable manner on the front roof frame part (1),
   a bow element (3) held on the front roof frame part (1), and
   a front frame (8) of the convertible vehicle, to which the front roof frame part (1) can be releasably locked,
   wherein a movement of the front bow (3) from a first opening position into a second opening position and unlocking of the front roof frame part (1) from the front frame (8) are coupled by a positive control.

2. The top as claimed in claim 1, wherein the positive control comprises a hoop element (20) connected to the front bow (3) and a catch element (21) which is held displaceably on the front roof frame part (1) and has a rocking lever (22).

3. The top as claimed in claim 2, wherein the front bow (3) and the hoop element (20) can be moved in a drivable manner via a driven cable (23).

4. The top as claimed in claim 2, wherein the catch element (21) is operatively connected to a locking element (25) of the front roof frame part (1) via a connecting element (24) preferably designed as a driven cable.

5. The top as claimed in claim 4, wherein the locking element (25) comprises a hook (25a) articulated pivotably on the front roof frame part, and a hook link (25b) articulated on the hook (25a) and on the front roof frame part.

6. The top as claimed in claim 5, wherein the hook (25a) interacts with a hoop roller (8a) formed on the front frame (8), with the hook (25a), in a closed state, being in a position beyond the dead center with regard to the hook link (25b).

7. The top as claimed in claim 1, wherein the front roof frame part (1) can be pivoted, with its orientation being retained, over the rear roof frame part (2).

8. The top as claimed in claim 7, wherein the front roof frame part (1) and the rear roof frame part (2) are connected in an articulated manner by means of a first link (1a) and a second link (1b), the front roof frame part (1), the rear roof frame part (2), the first link (1a) and the second link (1b) together forming a four bar linkage (1c).

9. The top as claimed in claim 7, wherein the rear roof frame part (2) is mounted pivotably on a pillar element (5) articulated on the vehicle body, with pivoting of the rear roof frame part (2) with respect to the pillar element (5) being controlled by means of a main link (6) articulated on the vehicle body and on the rear roof frame part (2).

10. The top as claimed in claim 9, wherein pivoting of the front roof frame part (1) is positively controlled via a control link (7) articulated on the main link (6).

11. The top as claimed in claim 7, wherein the front roof frame part (1) and the rear roof frame part (2) are part of a linkage chain which is positively controlled in its entirety.

12. The top as claimed in claim 7, wherein a complete opening of the top can be driven by means of a driving device (7).

* * * * *